(12) United States Patent
Augst

(10) Patent No.: US 10,994,747 B2
(45) Date of Patent: May 4, 2021

(54) METHOD AND DEVICE FOR AT LEAST PARTIALLY AUTOMATED DRIVING

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 298 days.

(21) Appl. No.: 16/040,757

(22) Filed: Jul. 20, 2018

(65) Prior Publication Data
US 2019/0047591 A1 Feb. 14, 2019

Related U.S. Application Data

(63) Continuation of application No. PCT/EP2017/050897, filed on Jan. 17, 2017.

(30) Foreign Application Priority Data

Jan. 22, 2016 (DE) .................. 10 2016 200 897.8

(51) Int. Cl.
*B60W 50/16* (2020.01)
*G05D 1/00* (2006.01)
(Continued)

(52) U.S. Cl.
CPC .............. *B60W 50/16* (2013.01); *B60Q 9/00* (2013.01); *B60W 10/04* (2013.01); *B60W 10/20* (2013.01);
(Continued)

(58) Field of Classification Search
CPC combination set(s) only.
See application file for complete search history.

(56) References Cited

U.S. PATENT DOCUMENTS

2007/0179697 A1 8/2007 Holler
2013/0124071 A1 5/2013 Engel
(Continued)

FOREIGN PATENT DOCUMENTS

CN 101336180 A 12/2008
CN 103101539 A 5/2013
(Continued)

OTHER PUBLICATIONS

International Search Report (PCT/ISA/210) issued in PCT Application No. PCT/EP2017/050897 dated Jun. 2, 2017 with English translation (six (6) pages).
(Continued)

*Primary Examiner* — Spencer D Patton
(74) *Attorney, Agent, or Firm* — Crowell & Moring LLP

(57) ABSTRACT

A method converts an at least partially automated driving maneuver in a vehicle. The method consists of determining, on the basis of surrounding data relating to a surroundings of the vehicle, a planned at least partially automated driving maneuver. The method also consists of generating a kinesthetically and/or haptic signal in relation to the planned driving maneuver for a driver of the vehicle. The method further consists of converting the planned driving maneuver if a predetermined affirmative control action is carried out and/or when a predetermined rejected control action is lacking.

33 Claims, 2 Drawing Sheets

(51) Int. Cl.
- *B60Q 9/00* (2006.01)
- *B60W 30/09* (2012.01)
- *B60W 10/22* (2006.01)
- *B60W 50/10* (2012.01)
- *B60W 30/14* (2006.01)
- *B60W 10/04* (2006.01)
- *B60W 10/20* (2006.01)
- *B60W 30/18* (2012.01)

(52) U.S. Cl.
CPC ............ *B60W 10/22* (2013.01); *B60W 30/09* (2013.01); *B60W 30/143* (2013.01); *B60W 30/18145* (2013.01); *B60W 30/18163* (2013.01); *B60W 50/10* (2013.01); *G05D 1/0061* (2013.01); *G05D 1/0088* (2013.01); *B60W 2540/215* (2020.02); *B60W 2555/00* (2020.02); *B60W 2720/12* (2013.01); *B60W 2720/16* (2013.01); *B60W 2720/18* (2013.01); *G05D 2201/0213* (2013.01)

(56) References Cited

U.S. PATENT DOCUMENTS

| | | | |
|---|---|---|---|
| 2013/0131905 | A1 | 5/2013 | Green et al. |
| 2013/0179023 | A1 | 7/2013 | Schmidt |
| 2013/0342339 | A1 | 12/2013 | Kiefer et al. |
| 2015/0165969 | A1 | 6/2015 | Cha et al. |
| 2016/0313733 | A1* | 10/2016 | Bellem ................. B60N 2/02 |
| 2017/0151958 | A1* | 6/2017 | Sakuma ............ G01C 21/3664 |
| 2017/0334446 | A1* | 11/2017 | Bosch ................... G08G 1/167 |
| 2017/0341648 | A1* | 11/2017 | Sanma .................. B60W 50/14 |
| 2018/0088572 | A1* | 3/2018 | Uchida ............. B60W 60/0053 |
| 2019/0077419 | A1* | 3/2019 | Sam Ma .............. G05D 1/0088 |
| 2020/0117187 | A1* | 4/2020 | Kothari ................. G08G 1/166 |

FOREIGN PATENT DOCUMENTS

| | | |
|---|---|---|
| CN | 103204166 A | 7/2013 |
| CN | 104724127 A | 6/2015 |
| DE | 10 2006 057 842 A1 | 6/2008 |
| DE | 10 2010 011 294 A1 | 10/2010 |
| DE | 10 2010 035 718 A1 | 3/2012 |
| DE | 10 2010 048 822 A1 | 4/2012 |
| DE | 10 2011 121 948 A1 | 6/2013 |
| DE | 10 2013 211 721 A1 | 12/2013 |
| DE | 10 2013 017 209 A1 | 4/2015 |
| DE | 10 2013 020 933 A1 | 6/2015 |
| DE | 10 2014 214 389 A1 | 1/2016 |
| EP | 0 449 615 A3 | 10/1991 |

OTHER PUBLICATIONS

German-language Written Opinion (PCT/ISA/237) issued in PCT Application No. PCT/EP2017/050897 dated Jun. 2, 2017 (five (5) pages).

German-language Search Report issued in counterpart German Application No. 10 2016 200 897.8 dated Nov. 24, 2016 with Partial English translation (eleven (11) pages).

German-language European Office Action issued in counterpart European Application No. 17701440.4 dated Jul. 24, 2019 (four (4) pages).

Chinese-language Office Action issued in Chinese Application No. 201780006467.9 dated Aug. 31, 2020 with English translation (22 pages).

\* cited by examiner

METHOD AND DEVICE FOR AT LEAST PARTIALLY AUTOMATED DRIVING

CROSS REFERENCE TO RELATED APPLICATIONS

This application is a continuation of PCT International Application No. PCT/EP2017/050897, filed Jan. 17, 2017, which claims priority under 35 U.S.C. § 119 from German Patent Application No. 10 2016 200 897.8, filed Jan. 22, 2016, the entire disclosures of which are herein expressly incorporated by reference.

BACKGROUND AND SUMMARY OF THE INVENTION

The invention relates to a method and a corresponding device for supporting a driver when driving a vehicle using an at least partially automated driving function.

Vehicles comprise an increased number of driving functions with which specific parts of the tasks of a driver as well as individual driving maneuvers (such as for example a parking maneuver) are at least performed in a partially automated manner by means of the vehicle. The degree of automation of the driving functions may differ. In general, at present it is necessary for the driver of the vehicle to monitor the area surrounding the vehicle or the related traffic situation or at least the notifications provided by the vehicle.

When a partially automated driving function is in operation, handling recommendations for a driver of the vehicle may be generated by the vehicle, for example on the basis of current data relating to the surrounding area, and said handling recommendations may then be implemented by the driver. Alternatively or in addition thereto, driving maneuvers may be planned and performed by means of a driving function in an automated or partially automated manner. Moreover, it is necessary for the driver of the vehicle to sufficiently trust in the (part-) automated driving function in order to achieve a safe and comfortable partially automated drive.

In multiple conceivable applications, automated or partially automated driving maneuvers may not be understood or may not be understood to a sufficient extent by the driver of the vehicle. The driver may also be surprised by intended specific maneuvers of the vehicle function or these intended maneuvers may not be desirable from the point of view of the driver, for example taking into consideration other road users.

Moreover, multiple conceivable alternative driving maneuvers that may be performed by a partially automated driving function may only be perceived as different from one another by the driver after a specific time after the start of the driving maneuver owing to (at least at first) their similar effect (such as for example a change of lane and making a turn). Situations are conceivable in which the driver may only understand specific intentions of the vehicle function if a driving maneuver is relatively well-advanced or may no longer be reversed.

Moreover, there is also the question after a participation (desired by the driver) in the case of specific decisions of an automated driving procedure of whether to switch off the automated driving procedure or whether to induce the corresponding driving function to switch off.

Owing to the fact that maneuver recommendations and/or maneuver decisions typically occur at short notice, it is important that information relating to this is conveyed to the driver of a vehicle having a (part-) automated driving function in a rapid and reliable manner. The current document addresses the technical object of providing a method and a corresponding device for a rapid and reliable cooperation between a (part-) automated driving function of a vehicle and a driver of the vehicle.

In accordance with one aspect, a method for implementing an at least partially automated driving maneuver in a vehicle is disclosed. The method may be performed by means of a device of the vehicle comprising a control unit. The method comprises determining, on the basis of data relating to the surrounding area of the vehicle, a planned at least partially automated driving maneuver. The planned driving maneuver may comprise a significant influence on the lateral control of the vehicle (also in the sense of a specific change of the lateral control). The step of determining the planned driving maneuver may comprise determining a plurality of different possible driving maneuvers, and also selecting the planned driving maneuver from the plurality of possible driving maneuvers.

Moreover, the method comprises generating a kinesthetic and/or haptic signal to a driver of the vehicle in relation to the planned driving maneuver. The kinesthetic and/or haptic signal is generated chronologically prior to the (at least partially automated) implementation of the planned driving maneuver in order to transmit to the driver of the vehicle, in particular in real time, that "the vehicle" or a corresponding driving function intends to implement the (specific) planned driving maneuver immediately or in the immediate future.

It is particularly preferred to transmit to the driver at least the type of the planned driving maneuver, by way of example a change of lane or making a turn (by way of example in relation to the current or next possibility for changing lanes or possibility for making a turn), a parking maneuver, a shunting maneuver, a turning maneuver, an overtaking maneuver, an evasive maneuver, etc. It is particularly preferred that the type of the planned driving maneuver that is determined may also be transmitted to the driver of the vehicle by means of the same signal or by means of a separate kinesthetic and/or haptic signal.

Moreover, the method comprises the step of implementing the planned driving maneuver if the driver performs a predetermined accepting operating action and/or if a predetermined rejecting operating action is not performed by the driver (within a predetermined time window in relation to generating the kinesthetic and/or haptic signal). The predetermined accepting operating action and the predetermined rejecting operating action are preferably different from one another. The accepting operating action indicates that the driver of the vehicle is in agreement with the planned driving maneuver being implemented. The rejecting operating action indicates that the driver rejects the implementation of the planned driving maneuver.

A rejection of a maneuver may also comprise (chronologically) postponing a driving maneuver.

The driver may introduce a desired influence into the implementation of specific maneuvers of the driving function in relation to the at least partially automated driving procedure without causing the driving function to be switched off or without rejecting the driving strategy of the driving function.

The method renders possible a rapid, reliable and intuitive cooperation between an at least partially automated driving function and a driver of the vehicle. In particular, a communication between the driver and vehicle is fundamentally improved with regard to specific driving maneuvers that may be performed in an at least partially automated manner.

The quality of the driving function and/or the comfort for the driver of the vehicle may thus be increased.

It is preferred that the driving maneuver comprises a significant part of the lateral control of the vehicle.

The step of generating the kinesthetic and/or haptic signal may include actuating an actuator of the vehicle in order to cause a lateral and/or vertical dynamic effect on the vehicle, in particular a short-term rolling movement and/or a pitching movement and/or a lifting or lowering movement of the passenger compartment of the vehicle and/or at least a part, in particular a segment, of the driving seat. The lateral and/or vertical dynamic effect is preferably performed in the direction that is (preferably essentially only) dependent upon the direction of the planned driving maneuver (and where appropriate corresponds to this direction).

It is particularly preferred that the direction of the generated kinesthetic and/or haptic signal that may be perceived by the driver of the vehicle essentially corresponds to the direction of the planned maneuver. In particular, it may be the direction in which a lateral control of the vehicle (or change of the lateral control) that is related to the maneuver is planned.

The method may also comprise allocating the direction of the planned maneuver to the perceptible direction of a haptic and/or kinesthetic signal. A kinesthetic and/or haptic signal may be generated that comprises at least in its perceivable effect on the driver of the vehicle a high degree of conformity or the highest possible degree of conformity with the direction that characterizes the maneuver.

A vertical dynamic effect is for example to be understood as a short-term soft roll and/or pitch and/or yaw and/or lift or lowering that is transmitted to the driver by means of the driving seat, in particular via the seating surface and backrest surface or surfaces that are in contact with the driving seat. The vertical dynamic effect may be caused using the actuators of the chassis of the vehicle that are used to stabilize or provide suspension for the vehicle in a vertical dynamic manner, and/or with the actuators that comprise a corresponding influence on the (individual) vehicle seat.

The kinesthetic signal itself may not (or must not) comprise a displacement or a significant displacement of the passenger compartment or the entire vehicle seat in the relevant (lateral) direction. Such a displacement would usually not be possible to realize using the actuator system that is typically provided in vehicles or may be misunderstood with regards to a possible interpretation by the driver.

A "rolling movement" may in particular be understood as a particularly short and slight rotation of the passenger compartment of the vehicle or the driving seat of the vehicle toward the left (anti-clockwise) in relation to an axis that is oriented forward and extends in the direction of travel of the vehicle, in particular parallel to the X-axis of the vehicle. Such a rolling movement may be caused by means of a short-term, relatively rapid lowering movement on the side of the vehicle in which the driving seat is located, by way of example only by a few centimeters, in particular combined with a slight lifting of the opposite-lying side. The rolling movement may be achieved by means of a combination of actuating one, two, three or four vertical dynamic actuators of the vehicle. The rolling movement may in turn be compensated after a specific time interval by means of slowly lifting the lowered side of the vehicle.

A rolling movement may be caused (actuated) so as to generate a vertical dynamic signal in such a manner that the driver only perceives the turn to the left and/or the lowering movement of his seat owing to an increase in the acceleration or only perceives the turn to the left or the lowering movement at least as the direction of the kinesthetic signal. A compensating lift or associated turn to the right may not be perceived or may not be perceived as significant owing to being performed essentially more slowly.

The relationships between perceptible kinesthetic or haptic signals with the direction of the maneuver and also the action of the driver may be understood by the driver—at the latest after a short learning period—by means of the operating actions that may be evaluated in the method.

Consequently, the kinesthetic and/or haptic signal may comprise information regarding the planned driving maneuver and said information may be rapidly perceived and interpreted in a precise and intuitive manner by the driver of the vehicle.

The type of the planned maneuver, in particular in the context of the current driving situation may be apparent for the driver. By way of example, an effect, which may be perceived as a slight short roll via the driving seat, in the left-hand direction or right-hand direction in the driving context of driving on a motorway may be interpreted as a change of lane in the left-hand or right-hand direction and may not possibly be confused with a planned parking maneuver on the left-hand or right-hand side of the road.

The kinesthetic and/or haptic signal may be generated in such a manner that the signal may be perceived more intensely on a driving seat of the vehicle than on another seat of the vehicle. In particular, the (at least subjective) perception or ability to perceive the kinesthetic and/or haptic signal may essentially be limited to the driving seat of the vehicle. Consequently, adverse effects on other occupants of the vehicle may be avoided with the result that the comfort of the at least partially automated driving function is further increased.

The step of generating the kinesthetic and/or haptic signal may comprise actuating an actuator on a driving seat of the vehicle. The at least one actuator of the driving seat may be actuated in particular in such a manner that the direction of the planned driving maneuver is indicated by means of a movement of the driving seat. Alternatively or in addition thereto, the step of generating the kinesthetic and/or haptic signal may comprise generating a deformation at least of a part of the driving seat of the vehicle.

In particular, actuators may be actuated and said actuators cause a mechanical effect on the passenger compartment of the vehicle. The mechanical effect may be a force, a thrust, a change in the mechanical resistance, a change in the angle and/or an accelerating effect. It is particularly preferred that a short-term, abrupt effect is generated, wherein said effect does not have a permanent effect or an effect that relates to the current journey. This may be limited to less than 0.5, 1, 3 or 5 seconds.

The use of one or multiple actuators of the vehicle renders it possible to purposefully communicate the at least partially automated driving function to the driver of the vehicle (without adversely impacting other occupants of the vehicle).

The method may comprise the step of determining an alternative at least partially automated driving maneuver. The alternative driving maneuver may be implemented by means of the device of the vehicle if the predetermined accepting operating action is not performed and/or if the predetermined rejecting operating action is performed (in other words if it is indicated by the driver that the planned driving maneuver is not to be implemented). The at least partially automated driving function may thus be provided in a robust manner.

The method may comprise the step of determining a degree of automation of the planned driving maneuver and/or the step of determining, on the basis of data relating to the surrounding area, a driving situation for which the planned driving maneuver was determined. In particular, a measurement may be determined for the degree of automation, in particular in the form of measurements that are in principle or qualitatively different. In the case of the measurement for the degree of automation, known measurements or category values may apply, in particular measurements or category values that are defined according to the German association of the automobile industry. By way of example the classes or category values for the degree of automation may be: A1—supported driving; A2—partially automated driving; A3—highly-automated driving; A4—automated driving; A0—unknown degree of automation or low confidence in the statements relating to the degree of automation.

In dependence upon the degree of automation and/or in dependence upon the driving situation, it may be determined whether it is necessary that the predetermined accepting operating action is performed and/or that the predetermined rejecting operating action is not performed in order to implement the planned driving maneuver. Consequently, the expected feedback of the driver to the kinesthetic and/or haptic signal may be tailored to a current situation with the result that the robustness of the partially automated driving function is further increased.

Alternatively or in addition thereto, the kinesthetic and/or haptic signal may be tailored to the degree of automation that is determined. The driver of the vehicle may thus be informed in an efficient manner regarding the support that is required by the driver whilst implementing the planned driving maneuver, with the result that the driver may decide in a precise manner whether he wants the planned driving maneuver to be implemented or not. The implementation of the planned driving maneuver may be prevented as required.

A first kinesthetic and/or haptic signal and a second kinesthetic and/or haptic signal may be of such a type that the driver of the vehicle may be able to differentiate between the two. The first kinesthetic and/or haptic signal may be used for the purpose of transmitting to the driver that it is necessary to perform the predetermined accepting operating action in order for the planned driving maneuver to be implemented. This signal may be used for example for the purpose of announcing relatively complex planned driving maneuvers (that require for example a relatively high degree of attention of the driver). Alternatively or in addition thereto, the second kinesthetic and/or haptic signal may be used for the purpose of transmitting to the driver that refraining from performing the predetermined rejecting operating action is sufficient for the planned driving maneuver to be implemented. This signal for example may be used for the purpose of announcing relatively few complex planned driving maneuvers (that require for example a relatively low degree of attention of the driver). The quality of the driving function and/or the comfort may thus be further increased.

In accordance with a further aspect, a device for a vehicle is disclosed. The device comprises at least one control unit that is configured so as to determine a planned at least partially automated driving maneuver on the basis of predetermined criteria.

Moreover, the device is configured so as to generate a kinesthetic and/or haptic signal in relation to the planned driving maneuver for a driver of the vehicle. Furthermore, the device is configured so as to implement the planned driving maneuver if a predetermined accepting operating action is performed and/or if a predetermined rejecting operating action is not performed. Moreover, the device may comprise further control units and/or means that are configured so as to perform the method. It is preferred that the device may also comprise: a sensor system that is configured so as to implement the method, and/or interfaces to further electronic units that may be installed in the vehicle, fastened or conjointly carried with the driver and/or with the vehicle. The device may also comprise means for exchanging data with a unit that is configured so as to perform the method outside the vehicle.

In accordance with a further aspect, a vehicle (in particular a motor-driven road vehicle for example a passenger car, a truck or a motor bike) is disclosed and said vehicle comprises the device that is disclosed in this document.

In accordance with a further aspect, a computer program in particular a computer program product is disclosed. The computer program may be loaded where appropriate directly into the internal storage device of a digital device (in particular an electronic device of a driver assist system in a vehicle having a computing unit). Furthermore, the computer program may comprise software code sections and the steps of the method may be performed using said code sections in accordance with any one of the disclosed method claims if the computer product runs on the digital device.

The vehicle is in particular a motor vehicle. Numerous advantages that are discussed in this document and further advantages that may be easily reproduced by the person skilled in the art result from said motor vehicle. Alternatively, the method may also be applied to aircraft or vessels.

Vehicle-guiding actions that comprise at least one procedure of laterally controlling the vehicle preferably in combination with a procedure of longitudinally controlling the vehicle may be viewed as maneuvers or driving maneuvers. A maneuver preferably comprises a lateral controlling procedure or such a combination of a lateral controlling procedure and a longitudinal controlling procedure that leads to a specific (predefined) result: for example a change of lanes or diverting to another lane (according to the road markings), for example to a first or a second neighboring lane in relation to the current traffic lane, parking in a parking space or parking spot, in particular in a specific or in the next free parking space or in the next free parking spot, a turning maneuver within the road, making a turn into a turning possibility, evading an obstacle or road user, and/or a merging procedure in order to cause a specific or next possible gap between at least two vehicles that are traveling.

In particular, a steering procedure by means of steering the front wheels and/or rear wheels of the vehicle may be understood as a lateral controlling procedure of the vehicle. Moreover, the lateral controlling procedure of the vehicle within the scope of the method alternatively or in addition thereto comprises distributing braking force and/or driving force to two or multiple wheels of the vehicle, which results in an at least in part lateral and/or turning movement of the vehicle (with respect to the previous direction of travel).

It is preferred that the method relates to a maneuver comprising a procedure of laterally controlling the vehicle. Planned maneuvers may also be transmitted to the driver of the vehicle using the generated kinesthetic and/or haptic signal (only) with reference to their procedure of laterally controlling the vehicle or the included lateral controlling portion of the maneuver. Consequently, where appropriate only a portion of the lateral controlling procedure of the planned driving maneuver may be transmitted to the driver by means of the kinesthetic and/or haptic signal.

It is preferred that the maneuver may also be characterized by a specific combination of the lateral controlling procedure and longitudinal controlling procedure of the vehicle. Such a combination may be for example a ratio, a time parameter or sequences of phases of the lateral acceleration and longitudinal acceleration. It is particularly preferred that in the method, information regarding the combination of controlling the vehicle using the lateral controlling procedure and longitudinal controlling procedure is also transmitted by means of at least one kinesthetic and/or haptic signal that is generated.

A significant effect on the lateral controlling procedure of the vehicle may in particular mean that a desired variable of the vehicle lateral controlling procedure is changed or a new desired variable is selected. A desired variable may be a desired variable of a lateral control regulation of the vehicle. In particular, the change of the desired variable typically relates to such a change, in particular to switching the desired variable that is used to perform the specific maneuver or a maneuver of a specific class or type. For example, the effect on the lateral control of the vehicle may be switching between the at least partially automated lane guidance within the traffic lane to a procedure of laterally controlling the vehicle into another lane. Moreover, a displacement of a desired variable of the procedure of laterally control the vehicle may also occur in which another lateral displacement (a lateral offset) within a lane or a gap with respect to a road user that is traveling to the side is selected within the scope of the maneuver.

A significant effect on the procedure of longitudinally controlling the vehicle may in particular mean that a desired variable of the vehicle velocity or the acceleration (for example an increase in speed or a braking procedure in the case of an overtaking procedure and/or a merging procedure or a spatial arrangement with respect to another road user) is changed. A desired variable may be a desired variable of a procedure of longitudinally regulating the vehicle.

The planned maneuver may be a maneuver that comprises a specific type, a specific result and/or specific quantitative values. By way of example, a planned maneuver may be a displacement of a route plan of the vehicle to another lane.

In particular, the step of determining a planned maneuver may be performed with reference to multiple predetermined conditions. These predetermined conditions may be determined on the basis of the data relating to the surrounding area in dependence upon the data of the vehicle sensor system and/or a map of the surrounding area, for example in dependence upon the data that is determined by means of evaluating the objects and the movement of said objects in the area surrounding the vehicle.

It is preferred that the step of determining a planned maneuver also comprises the step of determining that:

a maneuver of a specific type is necessary and/or expedient; and/or an expediently suitable or an optimized point in time for performing the maneuver is present; and/or a maneuver to another driving route and/or driving strategy and/or to the selected driving style is suitable; and/or vehicle systems are currently capable of performing the maneuver without significant disadvantages; and/or the maneuver is possible and/or necessary and/or may be performed in a comfortable manner in relation to the current traffic situation or for the traffic situation that is predicted in the immediate future.

This may be determined on the basis of data of relating to the surrounding area in dependence upon the data of the vehicle sensor system and/or a map of the surrounding area, for example in dependence upon an evaluation of the objects and their movement in the surrounding area of the vehicle.

A planned maneuver may also be a maneuver that has already been started and that is already performed using means of the vehicle. Such a variant of the method may relate for example to maneuvers that:

are critical maneuvers or maneuvers that are planned at short notice, for example an emergency maneuver or an evasive maneuver; and/or maneuvers in which the planning of said maneuvers is changed during their implementation; and/or maneuvers having at least two different phases, wherein a second or a further phase, for example a more critical or a more relevant phase is to be communicated to the driver.

A target parameter of a maneuver may comprise quantitative and/or qualitative information regarding the maneuver. A target variable of a maneuver (for example a lane change maneuver or an evasive maneuver) may be by way of example information regarding whether a maneuver, for example a lane change maneuver, relates to a first adjacent lane or to a second (further away, next-but-one) adjacent lane relative to a current lane. A target variable of a maneuver (for example a parking maneuver) may by way of example also comprise information regarding whether a parking maneuver is planned into a next or into a next-but-one parking space. A target variable of a maneuver (for example a turning maneuver) may comprise for example information regarding whether a turn is planned into the current or into one of the next turning possibilities.

Preferred embodiments of the method are disclosed below and the individual features of said embodiments may be combined with one another in an arbitrary manner (for example as variants of the features, alternatively or in addition to the hitherto claimed features). Moreover, the applicant reserves the right to claim these features also in each case individually where appropriate within the scope of a subsequent application.

The method may comprise the step of determining the direction and/or the type or the sort of a specific planned maneuver.

The method may optionally comprise the step of determining at least one point in time in relation to performing the maneuver. The at least one point in time may relate to: a starting point in time, a point in time at which it is no longer possible to safely reverse or cancel the maneuver, a point in time between two different phases of a multi-phase maneuver, and/or an end of a maneuver.

The method may comprise the step of determining control signals for one or multiple actuators of the vehicle, particularly preferably for one or multiple vertical and/or lateral dynamic actuators of the chassis of the vehicle and/or the vehicle seat. It is particularly preferred that the control signals relate to a combination of multiple actuators and/or a specific sequence or time delay between at least two actuations of at least one actuator.

The method may comprise actuating one or multiple actuators of the chassis and/or the vehicle seat in such a manner that at least the type and/or direction of the maneuver may be perceived by the driver of the vehicle via his haptic and/or kinesthetic sensory channel, in particular via the seating surface and/or backrest surface of the driver (thigh, buttocks, side parts, back, neck, head) by means of the driving seat.

It may be transmitted to the driver via at least one perceivable component of the haptic and/or kinesthetic signal that is oriented significantly to the side that the planned maneuver in relation to the corresponding direction is relative to the vehicle.

The method may optionally, alternatively or in addition thereto comprise: in the event of the planned maneuver also comprising a significant change in the longitudinal control of the vehicle, for example an accelerating phase for an overtaking maneuver or merging procedure, an adjustment of a seat segment may also be performed, preferably of the seat backrest of the vehicle, in dependence upon the acceleration vector in a chronological relation to the accelerating procedure. The adjustment of the seat segment (at least chronologically or spatially) may be combined with a further haptic and/or kinesthetic signal.

Moreover, at least one piece of time information in relation to the maneuver may also be transmitted, for example a start time of the maneuver and/or a transition from a first phase of a maneuver to a second phase of the maneuver and/or a termination of the maneuver. The point in time and/or the time interval of the adjustment of the seat segment may also be in direct relation to the maneuver, in particular to the accelerating procedure.

The method may comprise the step of ascertaining at least one operating action of the driver and said operating action in particular follows the driver perceiving the haptic and/or kinesthetic signal. It is preferred that the operating action comprises at least one operating gesture, in particular the operating action may comprise a gesture operation or a (3D)-touchscreen operation. It is particularly preferred that the operating gesture comprises directional information, in particular at least one fundamental directional reference or a directional component toward the right-hand side or the left-hand side relative to the direction of travel or orientation of the vehicle.

In the event of the vehicle being in a partially automated mode, and an operating action is determined that is allocated to an accepting operating action and/or if the direction of the operating action is allocated to the direction of the planned maneuver, the planned maneuver may then be performed.

In the event of the vehicle being in a partially automated mode, and an operating action is determined that is allocated to a rejecting operating action, then the maneuver is typically not performed, or a further action is performed in the event that it is determined that owing to the maneuver not being performed, a further action of the driver or of the vehicle is required.

In the event of the vehicle being in a highly-automated (up to the automated) mode, and an operating action is not determined or an operating action of the at least one specific operating action that is allocated to a rejecting operating action for a maneuver or a rejecting operating action for the specific maneuver is not determined, then the planned maneuver may be implemented.

The method may also comprise a step of evaluating the operating action in which the decision is made as to whether the specific maneuver, a maneuver of the specific type or an implementation of each maneuver is currently being rejected or is being rejected in relation to a specific period of time.

In a further example, a specific parking possibility for example may be determined as a free parking spot automatically or in dependence upon the query of the driver or a navigation system. This may be for example a parking space that is located for example in the direction 35° to the right-hand side relative to the vehicle. A driving function of the vehicle determines at least one planned partially automated parking maneuver of the vehicle into this parking space on the basis of the data relating to the area surrounding the vehicle.

The direction to which the parking maneuver (in this case the position of the parking space) relates is allocated to a direction of a kinesthetic and/or haptic signal that may be generated using the actuators that are present in the vehicle. By way of example, this may be a direction of 4, 8 or 16 spatial directions. The direction is allocated to the direction that comprises a highest possible degree of agreement with the direction of the maneuver that is determined.

A kinesthetic and/or haptic signal is generated that may be perceived as oriented or pointing in the allocated direction. By way of example, in the above-mentioned case a kinesthetic and/or haptic signal may be generated in a technically simple manner and the perceptible effect thereof is displayed in the forward right-hand side direction for the driver of the vehicle.

It is also preferred that the type of the maneuver is determined (in this example the "parking procedure" or parking along the right-hand side of the road). Along with the procedure of determining the type of the maneuver, the type of the maneuver itself is also transmitted to the driver of the vehicle using a kinesthetic and/or haptic signal that is generated at short notice.

The driver may comprehend the planned maneuver in a simple manner by looking into the surrounding area of the vehicle in the direction of the perceptible effect of the directed kinesthetic and/or haptic signal and may identify by means of a directional reference the related indicated parking space that the maneuver is aimed at, and/or may identify the intention to park the vehicle in this parking space in an at least partially automated manner.

Moreover, the parking maneuver may be performed with reference to the evaluation of the operating action of the driver that is subsequently ascertained or a search for another alternative parking space may subsequently be performed.

It is particularly preferred that the kinesthetic and/or haptic signal that is disclosed in this document may be generated using the chassis actuators, in particular using vertical dynamic actuators of the vehicle and/or using the actuators of the vehicle seat.

Kinesthetic signals may in particular comprise signals that for the most part are perceived via the vestibular system of the driver. The changes of the orientation of the human body within the space, said changes being caused by means of the kinesthetic signals that are generated and/or the accelerations acting upon the human body may be perceived by the driver by means of the vestibular sensory channel of the driver. In particular, in the case of a kinesthetic signal, this is a short-notice accelerating function that acts on the large part of the body and/or at least on the head of the driver.

It is preferred that kinesthetic signals may be generated that generate specific patterns from effects in specific directions and/or accordingly specific time functions, in particular sequences on the kinesthetic sensory channel.

A kinesthetic and/or haptic signal that is/are generated may be transferred in the method in particular directly or indirectly via the seating surface or backrest surface of the driver (thigh, buttocks, side parts, back, neck, head) by means of the driving seat.

A kinesthetic signal may also comprise a portion of the effect as a turn, in particular a so-called yaw, in relation to the coordinate system of the vehicle. A slight turning effect (for example a particularly short-notice yaw acceleration) about a vertical axis may be transmitted to the driver of the vehicle. Such a yaw may be generated for example using the actuators of the driving seat for example by means of actuating a combination of seat segments of the seat. A yawing kinesthetic signal may be allocated for example to a turning maneuver.

The physical effects that correspond to the kinesthetic and/or haptic signals may also be an additive effect in addition to the effects that otherwise may be generated using vehicle actuators. Other effects may be for example regular accelerations that are used to compensate disturbance variables for example to stabilize a roll of the vehicle or to compensate for inclines in the road, unevenness in the road. A kinesthetic and/or haptic signal may also be generated in such a manner that a (control-technical) desired variable of a stabilizing system is temporarily changed.

Stimuli that for the most part are perceived via the skin of the driver or via outer layers of tissue are understood to be haptic. The human capability in identifying a difference between the physical effects on different, in particular adjacent, body parts is crucial. It is possible by means of the haptic sensory channel of the driver to differentiate by means of the haptic signals that are generated between both spatial as well as temporal changes of the physical effect on different body parts.

It is preferred that haptic signals may be generated that generate specific pressure patterns or pressure changing patterns and/or targeted waves on the body of the driver, in particular on various skin parts of the driver.

It is particularly preferred that kinesthetic signals may be combined with haptic signals. It is particularly preferred that patterns may be formed that generate one or multiple effects on the kinesthetic sensory channel of the driver in specific directions and/or according to specific time functions, in particular sequences of effects and one or multiple pressure patterns or pressure changing patterns and/or targeted waves may be generated on the haptic sensory channel of the driver. Consequently, a large number of (intuitive) easily distinguishable kinesthetic-haptic messages may be generated that relate to different meanings, in particular in relation to a driving task, in particular to a specific maneuver.

It is to be noted that the methods, devices and systems disclosed in this document may be used both alone as well as in combination with other methods, devices and systems that are disclosed in this document. Furthermore, any aspect of the methods, devices and systems that are disclosed in this document may be combined with one another in diverse manners. In particular, the features of the claims may be combined with one another in diverse manners.

Other objects, advantages and novel features of the present invention will become apparent from the following detailed description of one or more preferred embodiments when considered in conjunction with the accompanying drawings.

DETAILED DESCRIPTION OF THE DRAWINGS

As explained in the introduction, the present document addresses the at least partially automated operation of a vehicle. In particular, the present document renders possible an intuitive, rapid and reliable communication of an at least partially automated driving function with the driver of a vehicle.

Figure 1:
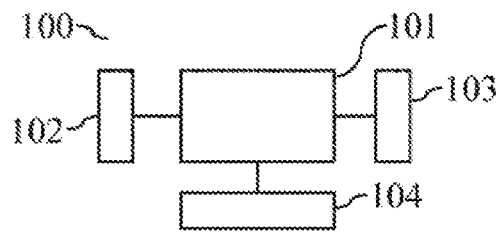
FIG. 1 illustrates exemplary components of a vehicle.

In this context, FIG. 1 illustrates exemplary components of a vehicle 100. The vehicle 100 comprises one or multiple surroundings sensors 102 and data relating to the surrounding area in relation to an area surrounding the vehicle 100 may be ascertained using said surroundings sensors. Exemplary surroundings sensors 102 are an image camera, a radar sensor, an ultrasonic sensor, a lidar sensor, etc. The surroundings sensors may be used by a control unit 101 of the device of the vehicle 100 for the purpose of controlling the vehicle 100 at least in part in an autonomous manner. In other words, one or multiple at least partially automated driving functions may be provided by means of the control unit 101 of the device on the basis of the data relating to the surrounding area. In other words, one or multiple driving maneuvers may be performed in an at least partially automated form by means of the device. One or multiple actuators 103 of the drive, the steering, the brake system and/or of the chassis of the vehicle 100 may be actuated so as to perform a driving maneuver.

When driving in an at least partially automated manner, there is a (relatively safe) decision for performing a (planned) driving maneuver typically at relatively short notice prior to the point in time in which the (planned) driving maneuver is performed. Consequently, typically only relatively little time remains to inform a driver of the vehicle 100 of the planned and/or recommended driving maneuver. In particular, an interpretation and implementation of a corresponding action recommendation by means of the driver with reference to a graphic display in many cases would take too much time.

The challenge may not be satisfactorily met by means of conceivably expanding the timescale for calculating automated maneuver decisions or driving maneuvers that are displayed, for example graphically, to the driver at a correspondingly early point in time. An expansion of the timescale for calculating automated maneuver decisions or driving maneuvers may lead to (infrequent but where necessary significant) deviations of the reality that actually occurs in comparison to the calculated prognosis. Moreover, a small increase in the timescale itself typically leads to a multiplied outlay (computing power, sensor power etc.), that increases exponentially with the increased timescale.

Furthermore, outputting information via a graphic display typically when using a partially automated (PAF) or a highly-automated (HAF) driving function is not particularly comfortable since this would require the driver to continuously monitor the graphic display and where appropriate would require one's eyes to accommodate to the display level.

In general, there are currently few means that render it possible for an at least partially automated driving function to communicate with a driver of the vehicle in a reliable, rapid and intuitive manner (in particular in relation to the rapid and clear transmission of a (planned) driving maneuver that is to be performed) in order to provide the driver of the vehicle with the possibility when required of promptly engaging in the driving operation and/or in order to convey to the driver trust in the actions of the at least partially automated driving function.

In the context of relieving the driver of the plurality of his driving tasks, the necessity of monitoring events that only seldom occur (such as a decision in the event of a specific maneuver) to which the driver in turn is to react particularly rapidly may lead to an increased probability of the driver not paying attention or of the driver being tired. Such a type of interaction is contrary to the optimal relationship for a driver between perception and action (also referred to as "flow"). The necessity of monitoring the display surfaces may be omitted by means of the method and it may lead to a rapid, in particular virtually instinctive decision of the driver, at least with regard to a lateral controlling maneuver.

In the case of a manual driving operation, experienced drivers of a vehicle 100 typically feel the behavior of the vehicle 100. In particular, the effects on control inputs (for example the actuation of the brake pedal or gas pedal and/or the actuation of the steering wheel) may be perceived by the driver directly by means of a longitudinal acceleration and/or lateral acceleration brought about by the vehicle (100). This form of the perception of a driver may be used within the scope of the method for the purpose of also transmitting one or multiple pieces of information regarding a first planned (but not necessarily started) driving maneuver to the driver of the vehicle. The driver may rapidly, reliably and intuitively ascertain this information and where appropriate react to said information (for example in order to prevent or where appropriate modify the planned driving maneuver).

The (part-) automated driving function (for example PAF or HAF) may for example (on the basis of the data relating to the surrounding area) monitor the free space on an adjacent lane of the lane of a road that is currently being driven on and may thereupon plan a lateral controlling maneuver at least as a route plan that is in particular optimized for the specific maneuver. Thereupon, at a suitable point in time, vertical dynamic actuators 103 of the vehicle 100 may be actuated with the result that a slight rolling movement of the passenger compartment of the vehicle 100 is generated in the relevant direction of the planned lateral controlling maneuver. For this purpose, particularly small rolling movements that cause displacements of less than 1 cm or 5 cm may be sufficient. These rolling movements may also be made in an immediately reversible manner.

In the case of a partially automated driving function (for example PAF), the movement of the vehicle 100 for the driver may mean that it is necessary for the driver to confirm the maneuver (for example using a slight steering torque at the steering wheel) in order to cause the planned lateral controlling maneuver to be performed automatically. Consequently, an accepting reaction of the driver to the planned lateral controlling maneuver is expected by means of the device of the vehicle. In the case of a highly-automated driving function (for example HAF) the lack of a rejecting operating action by the driver (for example gripping the steering wheel or a wipe-away gesture) may be evaluated as agreeing to the planned lateral controlling maneuver. In the two cases, the maneuver is performed in an automated manner. In particular, the displacement of the trajectory of the vehicle 100 may occur so as to achieve a specific maneuver target, for example to the adjacent lane, for example for an evasive, overtaking or merging maneuver.

A targeted vertical dynamic signal of this type (for example a rolling movement of the vehicle) is perceived significantly more rapidly and intuitively by means of the human vestibular system and kinesthesia than other effects (such as for example an optical or acoustic signal). Consequently, a driver reaction may occur significantly more rapidly. The time saved may be used for example for the purpose of bringing the point in time of outputting the kinesthetic and/or haptic signal closer to the point in time of actually performing/implementing the driving maneuver with the result that the quality of the decision may be improved in relation to the driving maneuver and/or the outlay for determining a decision in relation to a driving maneuver may be reduced.

Consequently, it is possible to avoid surprises that may be related to a highly-automated maneuver that is started suddenly or to an intention of the vehicle that is misunderstood by the driver. This in turn creates the possibility of influencing specific maneuvers in a necessary manner or in a manner that is desired by the driver.

A further advantage of outputting a kinesthetic and/or haptic signal is that it is not necessary for the driver to have his hands on the steering wheel, his foot on the pedals and his eyes on the road, when driving, in other words the driver is further relieved of a permanent or frequent contact with the steering wheel, with one of the pedals of the vehicle or from alternating his gaze from the area surrounding the vehicle and to the display of the vehicle in such a manner that the comfort for the driver is increased. In particular, outputting a kinesthetic and/or haptic signal renders it possible to reduce the required degree of attention of the driver since people are typically relatively sensitive in relation to kinesthetic and/or haptic signals.

Figure 2:
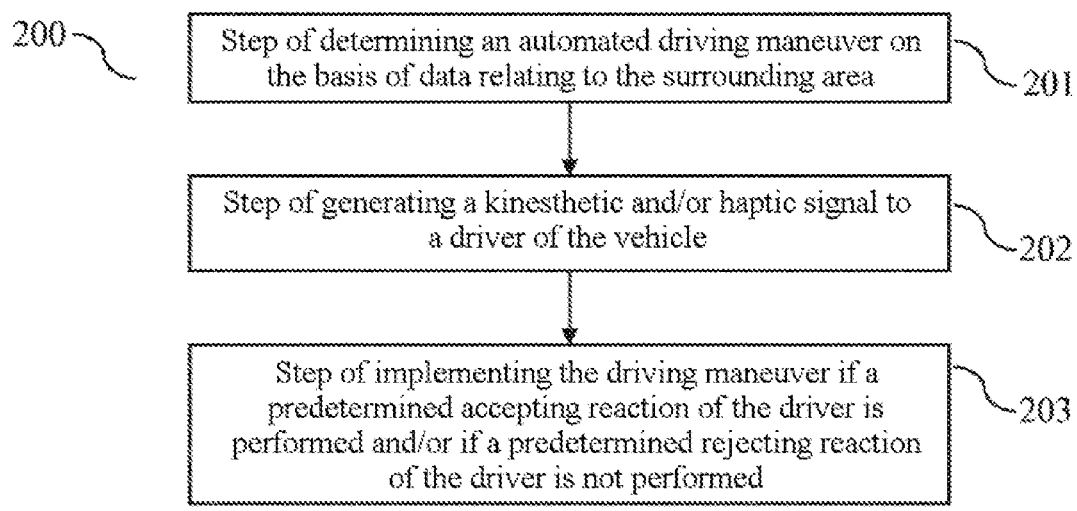
FIG. 2 illustrates a flow chart of an exemplary method for at least partially automated operation of a vehicle.

Consequently, a method for driving in an at least partially automated manner, and also a corresponding system, further means and a corresponding computer product are disclosed in this document. In particular, FIG. 2 illustrates a flow chart of an exemplary method 200 for performing or for implementing an at least partially automated driving maneuver in a vehicle 100. The method 200 may be implemented by means of a control unit 101 of the device of the vehicle 100. Furthermore, the at least partially automated driving maneuver may be performed or implemented at least in part in an autonomous manner by means of the control unit 101 of the device of the vehicle 100.

The method 200 comprises the step of determining 201, on the basis of data relating to the area surrounding the vehicle 100, a planned at least partially automated driving maneuver. The driving maneuver may comprise in particular the (at least partially automated and where appropriate fully-automated) procedure of laterally controlling the vehicle 100. Moreover, the method 200 comprises the step of generating 202 a kinesthetic and/or haptic signal in relation to the planned driving maneuver. The kinesthetic and/or haptic signal is generated in such a manner that it is perceptible for a driver of the vehicle 100. Moreover, the method 200 comprises the step of implementing 203 the planned driving maneuver (by means of the control unit 101 of the device of the vehicle 100), if the driver performs a predetermined accepting operating action and/or if the driver does not perform a predetermined rejecting operating action (within a predetermined time interval after generating the kinesthetic and/or haptic signal).

Within the scope of the method 200 for driving in an at least partially automated manner, the area surrounding the vehicle may consequently be evaluated (in other words the data relating to the surrounding area is evaluated). An at least provisional maneuver decision of a vehicle function may be performed, in other words a planned driving maneuver may be determined. In relation to the decision of intending to perform a driving maneuver, at least one kinesthetic and/or one haptic signal may be transmitted to the driver of the vehicle 100. The maneuver decision may then be implemented if in reaction to transmitting the signal a predetermined accepting operating action is performed by the driver or a predetermined rejecting operating action is not performed.

The maneuver is preferably a maneuver having a significant vehicle lateral control portion, in particular a change of lane, a merging procedure, an evasive maneuver, an overtaking maneuver, a turning maneuver, a shunting maneuver and/or a parking maneuver.

It is preferred that the maneuver decision comprises at least one route planning procedure or the maneuver decision may be represented by means of at least one route planning procedure. A route planning procedure may comprise multiple quantitative values and/or vector values that are characteristic for the maneuver. In the case of an at least provisional maneuver decision, the partially automated driving function (in other words PAF) or the highly-automated driving function (in other words HAF) may determine for example a free space that is located in a target lane or that is required according to the maneuver trajectory and thereupon may select for example a maneuver from two or multiple maneuver variants.

The method 200 may furthermore comprise actuating at least one vertical dynamic actuator 103 of the vehicle 100 in such a manner that a (typically slight) rolling movement of the passenger compartment is generated. The direction of the rolling movement typically points in the direction of the planned maneuver.

In general, a kinesthetic signal may be generated within the scope of the method 200 and said signal indicates the planned driving maneuver (in particular the direction of the planned driving maneuver). A kinesthetic signal may be characterized by an electronically controlled accelerating effect that may be perceived by means of the kinesthetic sensory channel of a vehicle occupant, in particular by means of his vestibular system and/or by means of kinesthesia. This may be an additive accelerating effect to the otherwise regulating accelerations that a chassis regulating system generates, by way of example also in order to compensate for inclines in the road, unevenness in the road or disturbances. This may also therefore be comprehended as an additive acceleration to the desired acceleration or to the other effect of an actuator 103 that is generated in dependence upon the information that is to be transmitted.

The method 200 may comprise the step of determining at least one parameter of at least one control signal for actuating the at least one actuator 103 of the vehicle 100. The parameter may be determined in such a manner that at least one resulting accelerating phase of the passenger compartment is oriented essentially in the direction of the driving maneuver. This direction may be referred to as the signal direction. Alternatively or in addition thereto, the parameter may be determined in such a manner that at least one resulting accelerating phase of the passenger compartment is essentially above the kinesthetic perception threshold of the driver. The at least one control signal may be determined in such a manner that the corresponding parameter of the accelerating effect that acts upon the passenger compartment of the vehicle comprises at least two phases, wherein at least one first phase is essentially oriented in the signal direction and is above the kinesthetic perception threshold of the driver. At least one parameter of the signal may be transferred by means of the signal message of the control signal within the vehicle. The actuators 103 are preferably vertical dynamic actuators of the vehicle 100.

At least one parameter of the control signal for actuating the at least one actuator 103 of the vehicle 100 may be determined in such a manner that at least one resulting accelerating phase of the passenger compartment is oriented essentially against the signal direction that is determined and below the kinesthetic perception threshold of the driver.

As a consequence, a combination of the accelerating effects on the passenger compartment occurs in two phases, wherein only the first accelerating phase is oriented in the signal direction and may be perceived as at least clearly more intensely by the driver of the vehicle than the second phase of the accelerating effect. The driver of the vehicle 100 perceives the at least one first phase as the signal direction of the kinesthetic signal. The second phase of the accelerating effect may be oriented essentially counter to the signal direction of the kinesthetic signal. The movement of the passenger compartment that occurs within a first phase may be compensated using this second phase. It is particularly preferred that the parameters of the at least one accelerating phase are selected in such a manner that the resulting accelerating effect is at least approximately 20% to approximately 50% below the kinesthetic perception threshold of the driver of the vehicle. Consequently, a relatively rapid procedure of stabilizing or restabilizing the passenger compartment may occur without the driver sensing the second phase, by way of example as a further kinesthetic signal in an opposing direction or as a disturbance. Consequently, the driver may effectively perceive the direction without his sense of comfort being disturbed.

At least one parameter of the accelerating effect that is above the kinesthetic perception threshold of the driver may be selected in such a manner that the resulting accelerating effect is more than 10% higher than the kinesthetic perception threshold of the driver and/or lower than approximately 200% to approximately 250% of the kinesthetic perception threshold of the driver. The at least one parameter of the accelerating effect may be selected in such a manner that it is rendered possible to transmit information regarding the planned driving maneuver to the driver in a safe but non-disturbing manner. It is preferred that the parameters are selected in such a manner that the resulting kinesthetic signal generates an accelerating effect that is approximately 120% to approximately 150% above the kinesthetic perception threshold of the driver.

The step of determining the parameter of the kinesthetic signal may comprise the step of determining a force that is acting upon the passenger compartment, said step also includes determining an amplitude value of the force that is acting on the passenger compartment, and determining at least an accelerating value of the passenger compartment, a duration of the acceleration of the passenger compartment, a temporal curve of the acceleration of the passenger compartment or the force that is acting upon the passenger compartment and/or a gradient of the acceleration of the passenger compartment.

The step of generating at least one accelerating effect may comprise the step of actuating at least one active damper of the vehicle 100, actuating at least one actuator 103 of an active roll stabilization, actuating at least one air suspension actuator and/or actuating at least one active electric vertical dynamic actuator.

It is preferred that at least one kinesthetic signal comprises at least one angular acceleration about the longitudinal axis or transverse axis of the vehicle 100 and/or an accelerating effect along the vertical axis of the vehicle. These accelerations may preferably correspond essentially to an angular acceleration about the X axis and/or Y axis of the vehicle 100. It is particularly preferred that the kinesthetic signal comprises a combination of at least two accelerating effects. In particular, such a combination may be generated simultaneously or may be delayed. The accelerating effect essentially along the vertical axis of the vehicle (Z axis) may correspond to the direction of a lifting movement and/or a lowering movement.

The step of generating at least one accelerating effect may be performed by means of actuating one or multiple active electric vertical dynamic actuators 103 of the vehicle 100 and said vertical dynamic actuators convert electrical energy that is supplied to them into a vertical movement of the vehicle 100 at at least one wheel of the vehicle 100. Depending upon the signal direction that is determined, the actuators 103 that are allocated to the right-hand side wheels and the left-hand side wheels, and/or the actuators 103 that are allocated to the two front wheels or to the two rear wheels may be actuated differently. A different actuation for at least three wheels or essentially in the same direction for all four wheels is also advantageous. Consequently, there is a variety of kinesthetic signals that may be generated and that may be interpreted by the driver as indications of a plurality of various distinguishable directions (or distinguishable driving maneuvers).

The actuators 103 of an active roll stabilization of the vehicle 100 may be controlled in such a manner that at least one directional component of the accelerating effect occurs, in particular a rolling acceleration.

Alternatively or in addition thereto, valves of active dampers of the vehicle 100 may be actuated in such a manner that the vertical dynamic behavior of the vehicle 100 displays a clearly perceptible relationship to the determined direction (of the driving maneuver). It is preferred that such an actuation occurs temporarily, in particular is shorter than approximately 1 second, preferably shorter than approximately 2 seconds, more preferably is shorter than approximately 5 seconds.

A combination of valve settings of an active damper in the pressure direction and/or tensile direction, preferably together with the actuation of other actuators 103 of the vehicle 100, may be selected in such a manner that a rolling acceleration, a pitching acceleration or lifting acceleration on the passenger compartment is changed and consequently the accelerating effect that is determined is generated.

Alternatively or in addition thereto, an accelerating effect may also be generated in such a manner that a small movement of the passenger compartment of the vehicle 100 is permitted (to a predetermined extent) under the effect of the gravitational force or centrifugal force by means of actuating one or multiple actuators 103 according to the parameter that is determined. By way of example, the shock absorbers of the vehicle 100 may be actuated in such a manner that an accelerating effect is permitted to the predetermined extent for less than 0.5 to 2 seconds under the effect of the gravitational force or centrifugal force.

A step of generating the accelerating effect is advantageously performed by means of actuating a combination of multiple actuators 103 of the vehicle 100.

The accelerating effect that is determined may also comprise in addition an acceleration of the vehicle 100 in the longitudinal direction and/or transverse direction and/or a yaw acceleration. A drive system and a braking system may be considered as an actuator 103 and in particular as an actuator 103 of the chassis of the vehicle 100. It is preferred that the actuator 103 is an electric drive or an electric generator of an electric vehicle or hybrid vehicle. In the case of these actuators 103, an acceleration component may be generated by means of a short-term actuation of the drive system of the vehicle 100 and said acceleration component together with a further vertical dynamic movement component that is generated by means of actuating one of the vertical dynamic actuators 103 in order to generate the accelerating effect that is determined. An acceleration in the transverse direction may preferably be generated by means of a short-term and approximately simultaneous actuation of a steering angle of the front axle and the rear axle. A kinesthetic signal may be generated that may be perceived as oriented essentially perpendicular to the direction of travel.

The method 200 may generate the kinesthetic signal by means of lowering at least a part of the vehicle 100 and may generate energy by means of lowering the vehicle, by way of example electrical energy. It is particularly preferred that the method 200 is developed in such a manner that at least in one phase of an accelerating effect the lowering at least of a part of the vehicle 100 is used to obtain energy. The energy may be electrical energy, hydraulic energy or pneumatic energy. The energy that is obtained in this manner during at least one phase of the accelerating effect may at least in part compensate an energy consumption during at least one other phase of the accelerating effect.

The method 200 may determine the acceleration background that acts upon the passenger compartment. At least one parameter of the kinesthetic signal and/or the point in time of generating the kinesthetic signal may be varied in dependence upon the acceleration background.

Alternatively or in addition thereto, a haptic and/or kinesthetic signal by way of example may also be transmitted by means of a driving seat or a steering wheel, a switching lever and/or the like. Consequently, the effect of the signal that is essentially transmitted via the seating surface may also be intensified or confirmed.

Moreover, at least one haptic and/or kinesthetic signal may also be transmitted in a similar or corresponding manner to a vehicle seat of a further occupant (a passenger).

The actuators 103 of the vehicle 100, in particular the actuators 104 of a driving seat of the vehicle 100, may be actuated in such a manner that the kinesthetic and/or haptic signal is only perceived by the driver. For this purpose, the vertical dynamic effects (rolling and/or pitching) may be generated for example about an axis that does not extend centrally through the vehicle 100. Moreover, at least two vertical dynamic influences (for example rolling, pitching, lifting or lowering) may be combined in such a manner that these influences are more intense on the driving seat than on the other seats of the vehicle 100.

It may be possible using an adjustment of the effects (in other words the signals) on the prevailing kinesthetic perception threshold of the driver that the information that is transmitted by the driving function is correctly perceived by the driver and does not disturb further vehicle occupants.

A kinesthetic and/or haptic signal may consequently be generated using an actuator 104 in a driving seat of the vehicle 100. The driving seat of a vehicle 100 typically comprises a plurality of actuators 104, by way of example for adjusting or deforming specific seat parts or for providing a massage function. In particular, active side rests of the driving seat may be used for the purpose of transmitting information in relation to a planned driving maneuver to the driver. Moreover, numerous further actuators 104 that are used for example to implement the seat adjustment possibility of a seat may be actuated in dependence upon a maneuver decision or in dependence upon a planned driving maneuver in order to transmit information in relation to the planned driving maneuver to the driver.

Within the scope of the method 200 at least one kinesthetic and/or one haptic signal may be generated by means of a deformation of at least one part of the driving seat. For example, a fluid container having a corresponding pump 104 may be installed in a vehicle seat. The pump 104 may be actuated during the at least partially automated driving procedure in order to transmit information in relation to a planned driving maneuver to the driver.

The direction of the maneuver decision or the planned driving maneuver may be displayed to the driver by means of one or multiple seat actuators 104. In particular, the backrests and/or fluid containers on the right-hand or left-hand side of the driving seat may be actuated in order to signal the direction of the driving maneuver. A particularly direct signal may be rendered possible by means of generating a kinesthetic and/or haptic signal by means of an actuator 104 of a driving seat and other occupants of the vehicle 100 are not negatively impacted by means of said signal.

Figure 3:
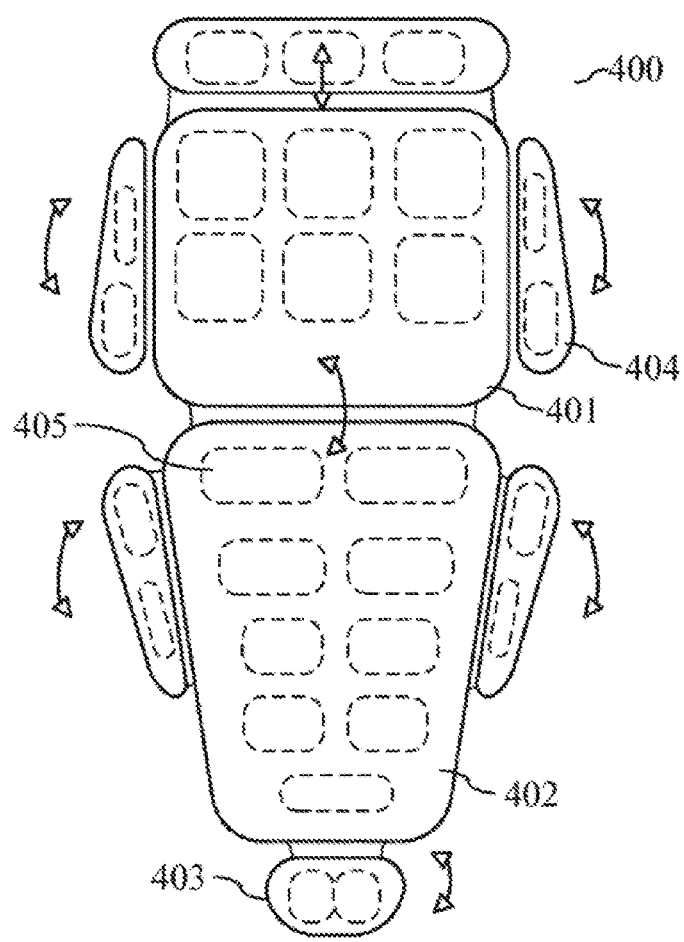
FIG. 3 illustrates exemplary segments of a vehicle seat of a vehicle.

FIG. 3 illustrates a schematic exemplary illustration of a driving seat 400, in particular a driving seat 400 from approximately the viewing position above the seating surface. The vehicle seat 400 comprises a plurality of segments 401, 402, 403, 404, by way of example a seating surface 401, a backrest 402, a headrest 403 and/or an arm rest 404. The limits of the seat segments are illustrated in FIG. 3 using solid lines. Furthermore, FIG. 3 illustrates individual part segments 405 by means of dashed lines. The seat segments 401, 402, 403, 404 (illustrated by solid lines) are typically individually adjustable (illustrated by means of the double arrows).

The actuators (typically used for a seat adjustment) of the vehicle seat 400 may be actuated so as to generate a kinesthetic and/or haptic signal. However, in contrast to a seat adjustment, typically a short-term, in particular rapid, physical effect occurs on the vehicle seat 400. The setting of the vehicle seat 400 prior to and after the physical effect typically remains unchanged.

A "concordant" change between the position angles and/or the height and/or the pressure at at least two segments or part segments of the vehicle seat 400 may occur so as to generate a kinesthetic signal at least in part by means of the actuators of a vehicle seat 400. Consequently, a signal may be generated that may be perceived via the kinesthetic sensory channel, in particular said signal comprising directional information. Among other things, as a consequence, a rolling movement may also be generated as a rolling pulse.

Part segments 405 are characterized using the dashed regions and using said part segments a physical effect that is in particular essentially localized and independent of other part segments may be generated on a corresponding body part of the occupant, for example the driver, and said body part is located near to the part segments 405.

A combination and/or a sequence of physical effects may be generated when generating a haptic signal and said combination and/or sequence of physical effects correspond to a specific chronological and/or spatial (two or three dimensional) distribution of a haptic stimulus via different part segments 405 of the seating surface and backrest surface of the vehicle seat 400. The pressure, the pressure pulse, the pressure curve or also further physical parameters of the respective part segments 405 may be changed, for example with regard to their smoothness or roughness.

Short-term physical effects may be generated on individual part segments 405 or segments 401, 402, 403, 404 in order to transmit a haptic and/or kinesthetic signal to an occupant (for example the driver). The individual segments may be actuated in an in each case isolated manner and/or in a delayed manner in order for example to transmit directional information to the occupant. Exemplary possibilities of adjusting the segments and where applicable corresponding directional information are indicated by means of the double arrows.

The at least provisional maneuver decision may be selected from two or multiple optional maneuver decisions, route planning procedures or driving styles of the vehicle 100. In other words, a plurality of possible driving maneuvers may be determined and one of said driving maneuvers is transmitted (is signaled using a sufficient quantity of information) to the driver of the vehicle 100 as a proposed driving maneuver. In the event of an accepting action not being confirmed or in the event of a rejection by means of a rejecting action of the driver, at least one alternative maneuver decision may be implemented by means of the vehicle 100 with without an operating action of the driver. In other words, the vehicle 100 may provide an alternative driving maneuver that is performed by means of the vehicle 100 if the proposed/planned driving maneuver is not selected.

The maneuver decision may be implemented if a first predetermined accepting operating action of the driver occurs or a second predetermined rejecting operating action is not performed, wherein the first operating action and the second operating action are different. By way of example, the first predetermined accepting operating action may be a steering wheel operation by the driver in the direction of the proposed driving maneuver, for example a difference steering angle and/or a steering torque that exceeds a predetermined value. The second predetermined rejecting operating action may be for example a steering wheel operation by the driver counter to the direction of the proposed driving maneuver, for example a difference steering angle and/or a steering torque that exceeds a predetermined value. Alternatively or in addition thereto, the second predetermined rejecting operating action may comprise actuating a control element so as to control the longitudinal control of the vehicle, for example a gas pedal, a brake pedal, a manual operating element for operating the velocity regulation (for example a "gas lever"), etc.

In dependence upon the degree of automation of the vehicle 100 and/or on the specific situation, a decision may be made as to whether the implementation of the maneuver requires an accepting operating action of the driver and/or whether it is sufficient that a rejecting operating action is not performed. The degree of automation is preferably a degree of automation that is currently determined or is determined for the immediate future, particularly preferably is the degree of automation that is determined for the specific driving maneuver.

The haptic and/or kinesthetic effect on the driver of the vehicle 100 may be varied depending upon the degree of automation that is predetermined for the planned driving maneuver.

Different classes of haptic and/or kinesthetic effects may be provided. These classes are designed in such a manner that the effects of two different classes are perceived differently by the driver, with the result that the driver may be able to differentiate between the different classes. In the case of a first class, the maneuver may be implemented (where appropriate exclusively) in dependence upon the fact that a specific accepting driver action is performed. In the case of a second class, the maneuver may be implemented (where appropriate exclusively) in dependence upon the fact that a specific rejecting driver action is not performed. The vehicle 100 may consequently inform the driver by means of the class of the haptic and/or kinesthetic effect whether the actuation of a specific accepting driver action is required or whether the fact that a specific rejecting driver action is not performed suffices. The fact that a specific rejecting action "is not performed" may relate to a specific timespan or to continuing a maneuver. In other words, a check may be performed as to whether within a specific time period a rejecting driver action has not been performed. If this is the case, the proposed driving maneuver may be performed (where appropriate irrevocably) by means of the vehicle 100.

The driver of a vehicle 100 having an at least partially automated driving function may be provided with a particular driving experience by means of the method 200 that is disclosed in this document. Furthermore, the method 200 renders it possible for the driver to rapidly and intuitively perceive a driving situation and a vehicle intention. The comfort for the driver may be increased by means of the time that is gained. Alternatively or in addition thereto, the quality of maneuver decisions and/or the outlay (sensor system, computing power, energy etc.) for providing an at least partially automated driving function may be reduced using the time that is gained. The method 200 also renders it possible for a driver to better understand and where appropriate to adjust the behavior of an at least partially automated driving function. Furthermore, increased freedoms and a reduced degree of attention may be rendered possible to the driver by means of the method 200.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for implementing an at least partially automated driving maneuver in a vehicle, the method comprising the steps of:
   determining, on the basis of data relating to surrounding area of the vehicle, a planned driving maneuver that is performable in an at least partially automated manner;
   generating a kinesthetic and/or haptic signal in relation to the planned driving maneuver to a driver of the vehicle;
   implementing the planned driving maneuver if a predetermined accepting operating action is performed and/or if a predetermined rejecting operating action is not performed; and
   determining a degree of automation of the planned driving maneuver, wherein
   the kinesthetic and/or haptic signal is dependent upon the degree of automation.

2. The method as claimed in claim 1, wherein
   the planned driving maneuver comprises a significant effect on a lateral control of the vehicle;
   the step of generating the kinesthetic signal comprises the step of actuating an actuator of the vehicle in order to cause at least one vertical dynamic effect, on a passenger compartment of the vehicle and/or on at least one segment of a driving seat of the vehicle; and
   a direction of the vertical dynamic effect is dependent upon a direction of the planned driving maneuver.

3. The method as claimed in claim 2, wherein
   the vertical dynamic effect is a rolling movement.

4. The method as claimed in claim 1, wherein
   the planned driving maneuver comprises a significant effect on a lateral control of the vehicle;
   the step of generating the haptic signal comprises actuating an actuator of a driving seat in order to cause at least one targeted haptic effect via a driving seat of the vehicle; and
   a direction of the haptic effect is dependent upon a direction of the planned driving maneuver.

5. The method as claimed in claim 1, wherein
   the planned driving maneuver comprises a significant change in longitudinal control of the vehicle;
   at least one actuator of a driving seat of the vehicle is actuated such that an adjustment of at least one seat segment of the driving seat is performed;
   the adjustment of the seat segment is dependent on at least one direction of the change in the longitudinal control of the vehicle.

6. The method as claimed in claim 5, wherein
   a direction of the adjustment of the seat segment is dependent on at least one direction of the change in the longitudinal control of the vehicle.

7. The method as claimed in claim 1, wherein
   the kinesthetic and/or haptic signal is generated such that the signal is perceptible at least more intensely at a driving seat of the vehicle than at another seat of the vehicle.

8. The method as claimed in claim 1, wherein
   the step of generating the kinesthetic and/or haptic signal comprises actuating an actuator at a driving seat of the vehicle such that a direction of the planned driving maneuver is transmitted via a movement of the driving seat.

9. The method as claimed in claim 1, wherein
   the step of generating the kinesthetic and/or haptic signal comprises generating a deformation of at least one part of a driving seat of the vehicle, and
   the deformation of the driving seat is allocated to a type of the planned driving maneuver.

10. The method as claimed in claim 1, wherein
    the step of determining the planned driving maneuver comprises determining at least one type of the planned driving maneuver and/or a target parameter of the planned driving maneuver; and
    the step of generating a kinesthetic and/or haptic signal is performed such that at least the type of the planned driving maneuver and/or at least the target parameter of the planned driving maneuver is transmitted using the signal.

11. The method as claimed in claim 1, wherein
    the step of determining the planned driving maneuver comprises:
    determining a plurality of different possible driving maneuvers in dependence upon the data relating to the surrounding area; and
    selecting the planned driving maneuver from the plurality of possible driving maneuvers according to any one or multiple predetermined criteria.

12. The method as claimed in claim 1, further comprising the steps of:
    determining an alternative driving maneuver that may be performed in an at least partially automated manner; and
    implementing the alternative driving maneuver if a predetermined accepting operating action is not performed and/or if a predetermined rejecting operating action is performed.

13. The method as claimed in claim 1, wherein
    the predetermined accepting operating action and the predetermined rejecting operating action are different.

14. The method as claimed in claim 1, further comprising the steps of;
- determining a degree of automation of the planned driving maneuver and/or determining, on the basis of the data relating to the surrounding area, a driving situation for which the planned driving maneuver was determined;
- determining, in dependence upon the degree of automation and/or in dependence upon the driving situation, whether it is necessary for:
  - the predetermined accepting operating action to be performed; and/or
  - the predetermined rejecting operating action not to be performed,
  - in order for the planned driving maneuver to be implemented.

15. The method as claimed in claim 1, wherein
- a first kinesthetic and/or haptic signal and a second kinesthetic and/or haptic signal are configured in such a manner that the driver of the vehicle may be able to differentiate between the two; and
- the first kinesthetic and/or haptic signal transmits to the driver that it is necessary to perform a predetermined accepting operating action in order for the planned driving maneuver to be implemented; and/or
- the second kinesthetic and/or haptic signal transmits to the driver that it is sufficient that a predetermined rejecting operating action is not performed in order for the planned driving maneuver to be implemented.

16. A computer program product comprising a non-transitory computer readable medium having stored thereon program code sections that, when executed on a processor, carry out the acts of:
- determining, on the basis of data relating to surrounding area of a vehicle, a planned driving maneuver that is performable in an at least partially automated manner;
- generating a kinesthetic and/or haptic signal in relation to the planned driving maneuver to a driver of the vehicle;
- implementing the planned driving maneuver if a predetermined accepting operating action is performed and/or if a predetermined rejecting operating action is not performed; and
- determining a degree of automation of the planned driving maneuver, wherein
  - the kinesthetic and/or haptic signal is dependent upon the degree of automation.

17. A device, comprising:
- a control unit for a vehicle, wherein the control unit of the device is configured to:
  - determine, on the basis of data relating to the surrounding area of the vehicle, a planned driving maneuver that is performable in an at least partially automated manner;
  - generate a kinesthetic and/or haptic signal in relation to the planned driving maneuver for a driver of the vehicle;
  - implement the planned driving maneuver if a predetermined accepting operating action is performed and/or if a predetermined rejecting operating action is not performed; and
  - determine a degree of automation of the planned driving maneuver, wherein
    - the kinesthetic and/or haptic signal is dependent upon the degree of automation.

18. A method for implementing an at least partially automated driving maneuver in a vehicle, the method comprising the steps of:
- determining, on the basis of data relating to surrounding area of the vehicle, a planned driving maneuver that is performable in an at least partially automated manner;
- generating a kinesthetic and/or haptic signal in relation to the planned driving maneuver to a driver of the vehicle;
- implementing the planned driving maneuver if a predetermined accepting operating action is performed and/or if a predetermined rejecting operating action is not performed;
- determining a degree of automation of the planned driving maneuver and/or determining, on the basis of the data relating to the surrounding area, a driving situation for which the planned driving maneuver was determined; and
- determining, in dependence upon the degree of automation and/or in dependence upon the driving situation, whether it is necessary for:
  - the predetermined accepting operating action to be performed; and/or
  - the predetermined rejecting operating action not to be performed,
  - in order for the planned driving maneuver to be implemented.

19. The method as claimed in claim 18, wherein
- the planned driving maneuver comprises a significant effect on a lateral control of the vehicle;
- the step of generating the kinesthetic signal comprises the step of actuating an actuator of the vehicle in order to cause at least one vertical dynamic effect, on a passenger compartment of the vehicle and/or on at least one segment of a driving seat of the vehicle; and
- a direction of the vertical dynamic effect is dependent upon a direction of the planned driving maneuver.

20. The method as claimed in claim 19, wherein the vertical dynamic effect is a rolling movement.

21. The method as claimed in claim 18, wherein
- the planned driving maneuver comprises a significant effect on a lateral control of the vehicle;
- the step of generating the haptic signal comprises actuating an actuator of a driving seat in order to cause at least one targeted haptic effect via a driving seat of the vehicle; and
- a direction of the haptic effect is dependent upon a direction of the planned driving maneuver.

22. The method as claimed in claim 18, wherein
- the planned driving maneuver comprises a significant change in longitudinal control of the vehicle;
- at least one actuator of a driving seat of the vehicle is actuated such that an adjustment of at least one seat segment of the driving seat is performed;
- the adjustment of the seat segment is dependent on at least one direction of the change in the longitudinal control of the vehicle.

23. The method as claimed in claim 22, wherein
- a direction of the adjustment of the seat segment is dependent on at least one direction of the change in the longitudinal control of the vehicle.

24. The method as claimed in claim 18, wherein
the kinesthetic and/or haptic signal is generated such that the signal is perceptible at least more intensely at a driving seat of the vehicle than at another seat of the vehicle.

25. The method as claimed in claim 18, wherein
the step of generating the kinesthetic and/or haptic signal comprises actuating an actuator at a driving seat of the vehicle such that a direction of the planned driving maneuver is transmitted via a movement of the driving seat.

26. The method as claimed in claim 18, wherein
the step of generating the kinesthetic and/or haptic signal comprises generating a deformation of at least one part of a driving seat of the vehicle, and
the deformation of the driving seat is allocated to a type of the planned driving maneuver.

27. The method as claimed in claim 18, wherein
the step of determining the planned driving maneuver comprises determining at least one type of the planned driving maneuver and/or a target parameter of the planned driving maneuver; and
the step of generating a kinesthetic and/or haptic signal is performed such that at least the type of the planned driving maneuver and/or at least the target parameter of the planned driving maneuver is transmitted using the signal.

28. The method as claimed in claim 18, wherein
the step of determining the planned driving maneuver comprises:
determining a plurality of different possible driving maneuvers in dependence upon the data relating to the surrounding area; and
selecting the planned driving maneuver from the plurality of possible driving maneuvers according to any one or multiple predetermined criteria.

29. The method as claimed in claim 18, further comprising the steps of:
determining an alternative driving maneuver that may be performed in an at least partially automated manner; and
implementing the alternative driving maneuver if a predetermined accepting operating action is not performed and/or if a predetermined rejecting operating action is performed.

30. The method as claimed in claim 18, wherein
the predetermined accepting operating action and the predetermined rejecting operating action are different.

31. The method as claimed in claim 18, wherein
a first kinesthetic and/or haptic signal and a second kinesthetic and/or haptic signal are configured in such a manner that the driver of the vehicle may be able to differentiate between the two; and
the first kinesthetic and/or haptic signal transmits to the driver that it is necessary to perform a predetermined accepting operating action in order for the planned driving maneuver to be implemented; and/or
the second kinesthetic and/or haptic signal transmits to the driver that it is sufficient that a predetermined rejecting operating action is not performed in order for the planned driving maneuver to be implemented.

32. A computer program product comprising a non-transitory computer readable medium having stored thereon program code sections that, when executed on a processor, carry out the acts of:
determining, on the basis of data relating to surrounding area of a vehicle, a planned driving maneuver that is performable in an at least partially automated manner;
generating a kinesthetic and/or haptic signal in relation to the planned driving maneuver to a driver of the vehicle;
implementing the planned driving maneuver if a predetermined accepting operating action is performed and/or if a predetermined rejecting operating action is not performed;
determining a degree of automation of the planned driving maneuver and/or determining, on the basis of the data relating to the surrounding area, a driving situation for which the planned driving maneuver was determined; and
determining, in dependence upon the degree of automation and/or in dependence upon the driving situation, whether it is necessary for:
the predetermined accepting operating action to be performed; and/or
the predetermined rejecting operating action not to be performed,
in order for the planned driving maneuver to be implemented.

33. A device, comprising:
a control unit for a vehicle, wherein the control unit of the device is configured to:
determine, on the basis of data relating to the surrounding area of the vehicle, a planned driving maneuver that is performable in an at least partially automated manner;
generate a kinesthetic and/or haptic signal in relation to the planned driving maneuver for a driver of the vehicle;
implement the planned driving maneuver if a predetermined accepting operating action is performed and/or if a predetermined rejecting operating action is not performed;
determine a degree of automation of the planned driving maneuver and/or determining, on the basis of the data relating to the surrounding area, a driving situation for which the planned driving maneuver was determined; and
determine, in dependence upon the degree of automation and/or in dependence upon the driving situation, whether it is necessary for:
the predetermined accepting operating action to be performed; and/or
the predetermined rejecting operating action not to be performed,
in order for the planned driving maneuver to be implemented.

\* \* \* \* \*